United States Patent
Son

(10) Patent No.: US 10,625,832 B2
(45) Date of Patent: Apr. 21, 2020

(54) DEVICE FOR CONTROLLING HORIZONTALITY OF SMALL SHIP BY USING VARIABLE MAST

(71) Applicant: KOREA INSTITUTE OF OCEAN SCIENCE & TECHNOLOGY, Ansan-si, Gyeonggi-do (KR)

(72) Inventor: Nam Sun Son, Daejeon (KR)

(73) Assignee: KOREA INSTITUTE OF OCEAN SCIENCE & TECHNOLOGY, Ansan-si, Gyeonggi-do (KR)

( * ) Notice: Subject to any disclaimer, the term of this patent is extended or adjusted under 35 U.S.C. 154(b) by 217 days.

(21) Appl. No.: 16/060,028

(22) PCT Filed: Dec. 21, 2016

(86) PCT No.: PCT/KR2016/014972
§ 371 (c)(1),
(2) Date: Jun. 7, 2018

(87) PCT Pub. No.: WO2017/111446
PCT Pub. Date: Jun. 29, 2017

(65) Prior Publication Data
US 2018/0362125 A1    Dec. 20, 2018

(30) Foreign Application Priority Data
Dec. 24, 2015    (KR) .................... 10-2015-0185834

(51) Int. Cl.
*B63B 43/08*    (2006.01)
*B63B 39/02*    (2006.01)
(Continued)

(52) U.S. Cl.
CPC .............. *B63B 43/08* (2013.01); *B63B 15/00* (2013.01); *B63B 15/0083* (2013.01);
(Continued)

(58) Field of Classification Search
CPC ..... B63B 43/08; B63B 15/00; B63B 15/0083; B63B 39/02; B63B 39/04; B63B 43/04;
(Continued)

(56) References Cited

U.S. PATENT DOCUMENTS

| 5,560,310 A | * | 10/1996 | Christensen | ............ B63B 39/02 |
| | | | | 114/124 |
| 2008/0237173 A1 | * | 10/2008 | Altman | ................... B63B 27/02 |
| | | | | 212/347 |
| 2011/0278252 A1 | * | 11/2011 | De Carvalho Cal | ... B66C 13/16 |
| | | | | 212/279 |

FOREIGN PATENT DOCUMENTS

| KR | 20-2009-0007779 U | 7/2009 |
| KR | 10-2010-0121822 A | 11/2010 |

(Continued)

OTHER PUBLICATIONS

International Search Report for PCT/KR2016/014972 dated Mar. 10, 2017 from Korean Intellectual Property Office.

*Primary Examiner* — Calvin Cheung
(74) *Attorney, Agent, or Firm* — Revolution IP, PLLC

(57) ABSTRACT

Disclosed, as a device for correcting the horizontality of the small ship according to the present invention, is a device for controlling the horizontality of a small ship by using a variable mast, the device comprising: a tilt sensing unit for sensing the tilt of the small ship; a position adjustment unit formed such that at least a portion thereof can move in the horizontal direction on the deck of the small ship, and having a separate mast loaded on an upper part thereof to support the mast such that the mast is located at a predetermined height or higher; and a horizontality control unit for correcting the center of gravity of the small ship by adjusting a position of the mast through the position adjustment unit in correspondence to the tilt sensed by the tilt sensing unit.

7 Claims, 7 Drawing Sheets

(51) Int. Cl.
    *B63B 43/04*     (2006.01)
    *B63B 39/04*     (2006.01)
    *B63B 15/00*     (2006.01)
    *G01C 9/00*     (2006.01)
    *B63B 35/00*     (2020.01)

(52) U.S. Cl.
    CPC .............. *B63B 39/02* (2013.01); *B63B 39/04* (2013.01); *B63B 43/04* (2013.01); *G01C 9/00* (2013.01); *B63B 2015/0058* (2013.01); *B63B 2015/0075* (2013.01); *B63B 2035/006* (2013.01)

(58) Field of Classification Search
    CPC .... B63B 2015/0058; B63B 2015/0075; B63B 2035/006; G01C 9/00
    See application file for complete search history.

(56) References Cited

FOREIGN PATENT DOCUMENTS

| | | |
|---|---|---|
| KR | 10-2011-0064829 A | 6/2011 |
| KR | 10-2012-0056427 A | 6/2012 |
| KR | 10-2014-0070228 A | 6/2014 |

\* cited by examiner

[FIG. 1]
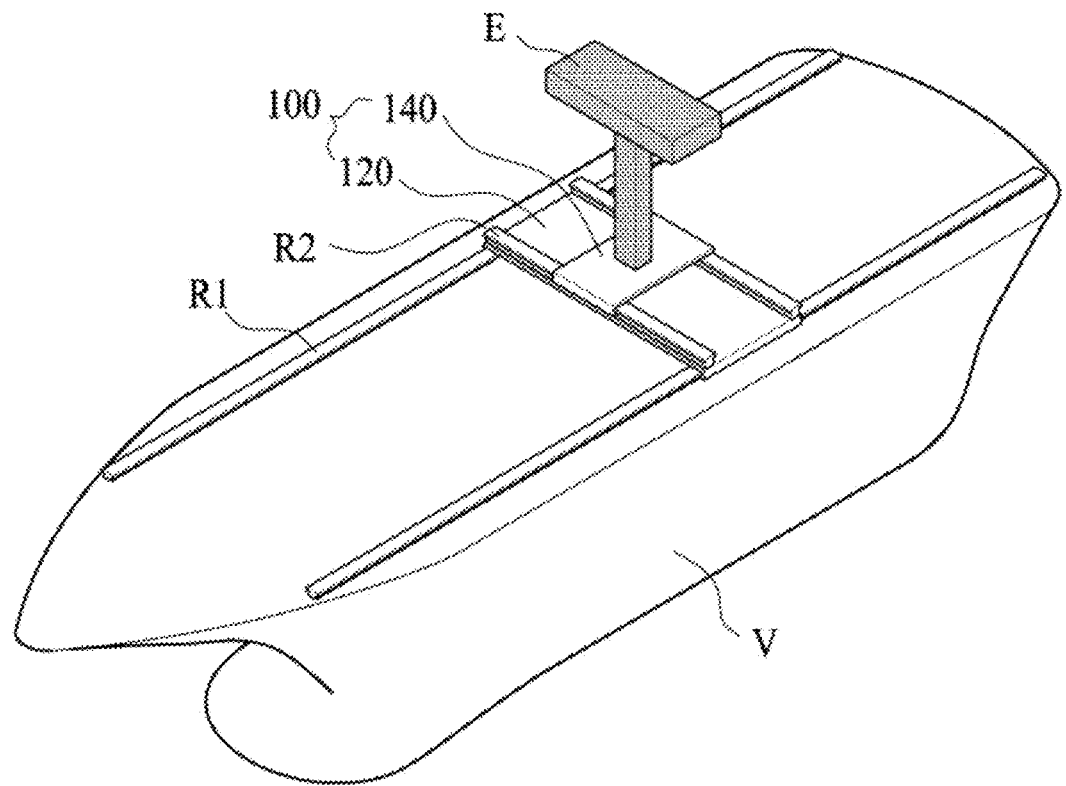
[FIG. 2]
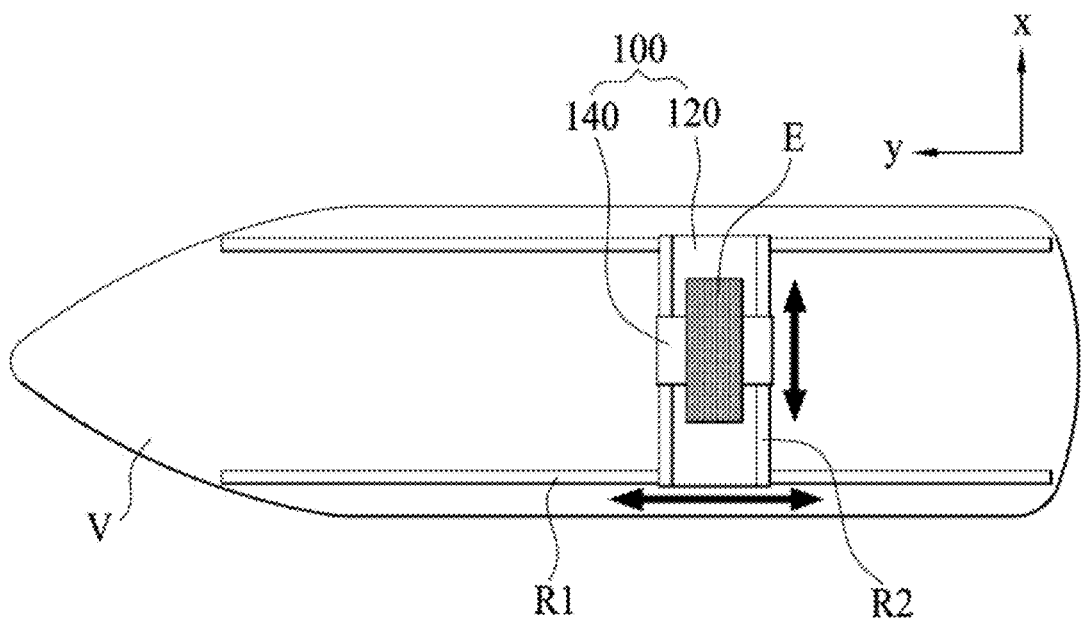

[FIG. 3]
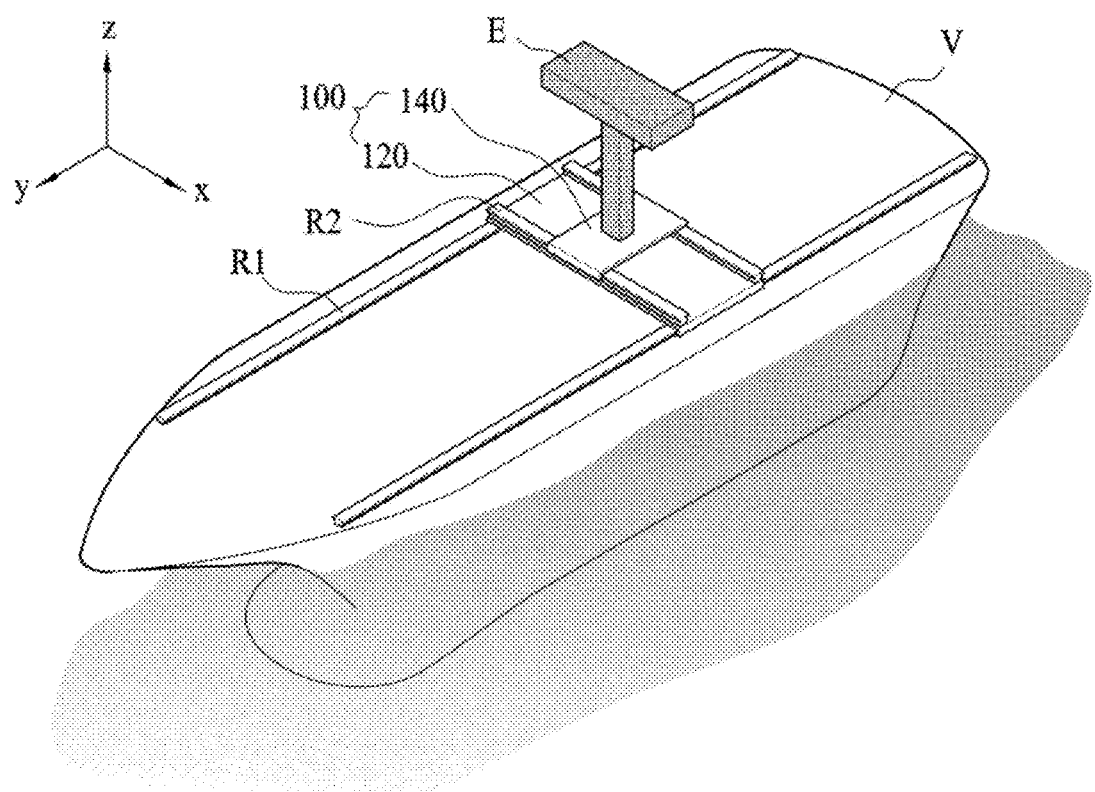

[FIG. 4]
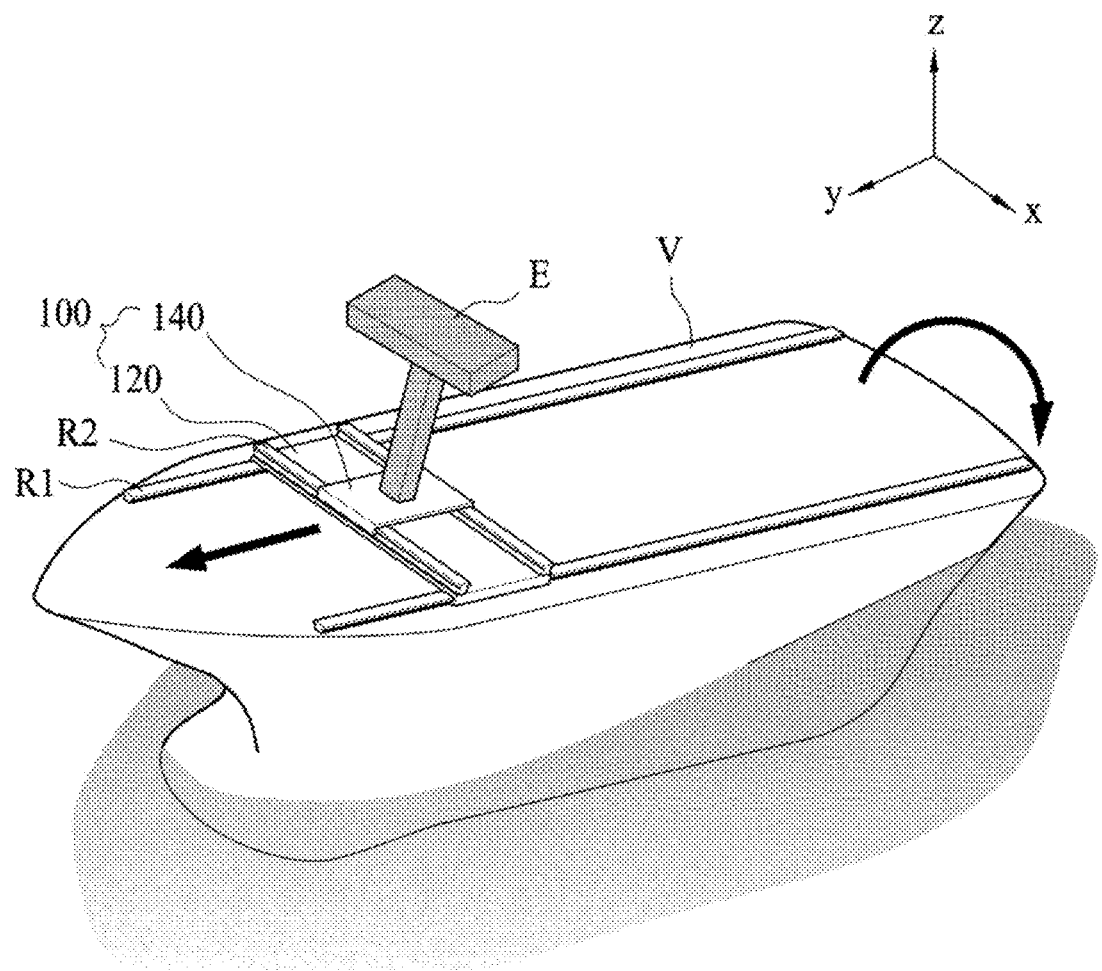

[FIG. 5]
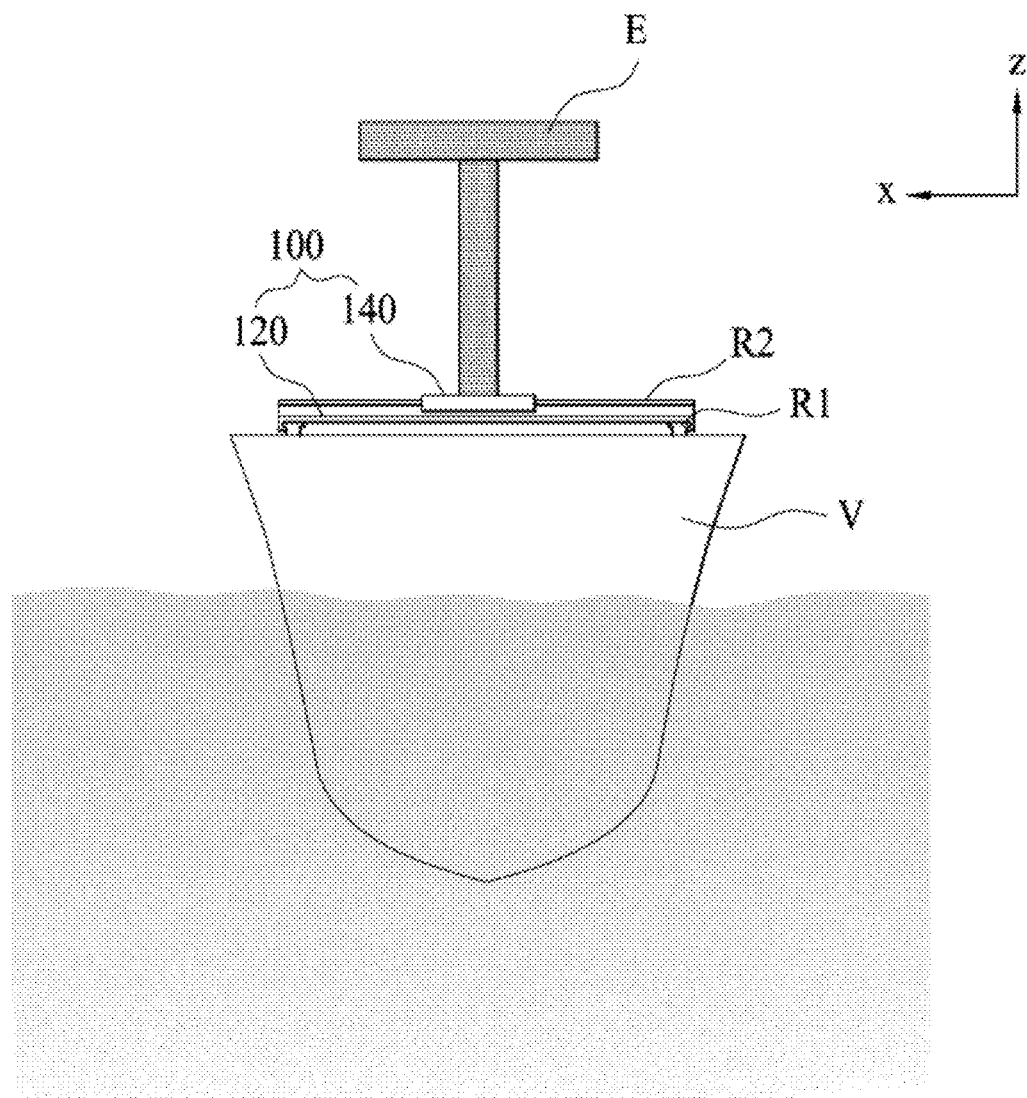

[FIG. 6]
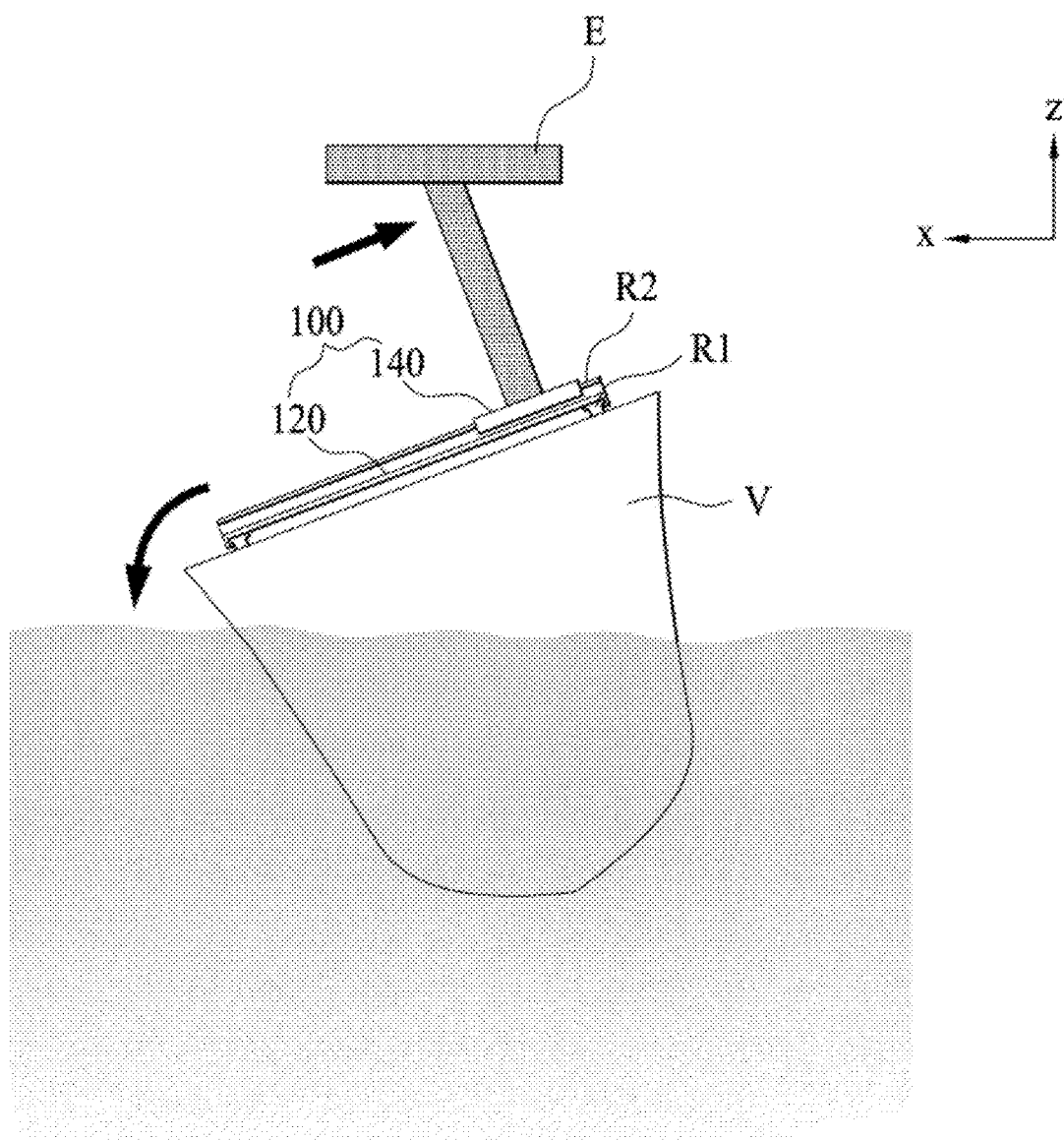

[FIG. 7]
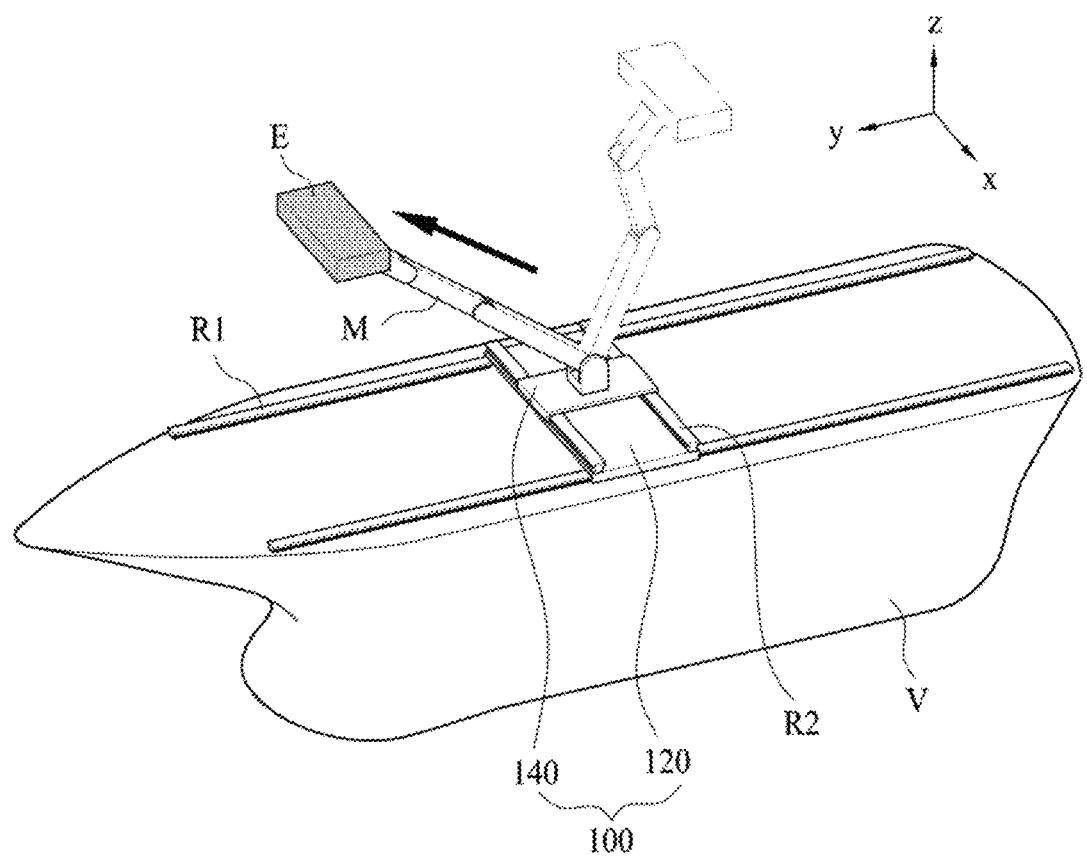

[FIG. 8]
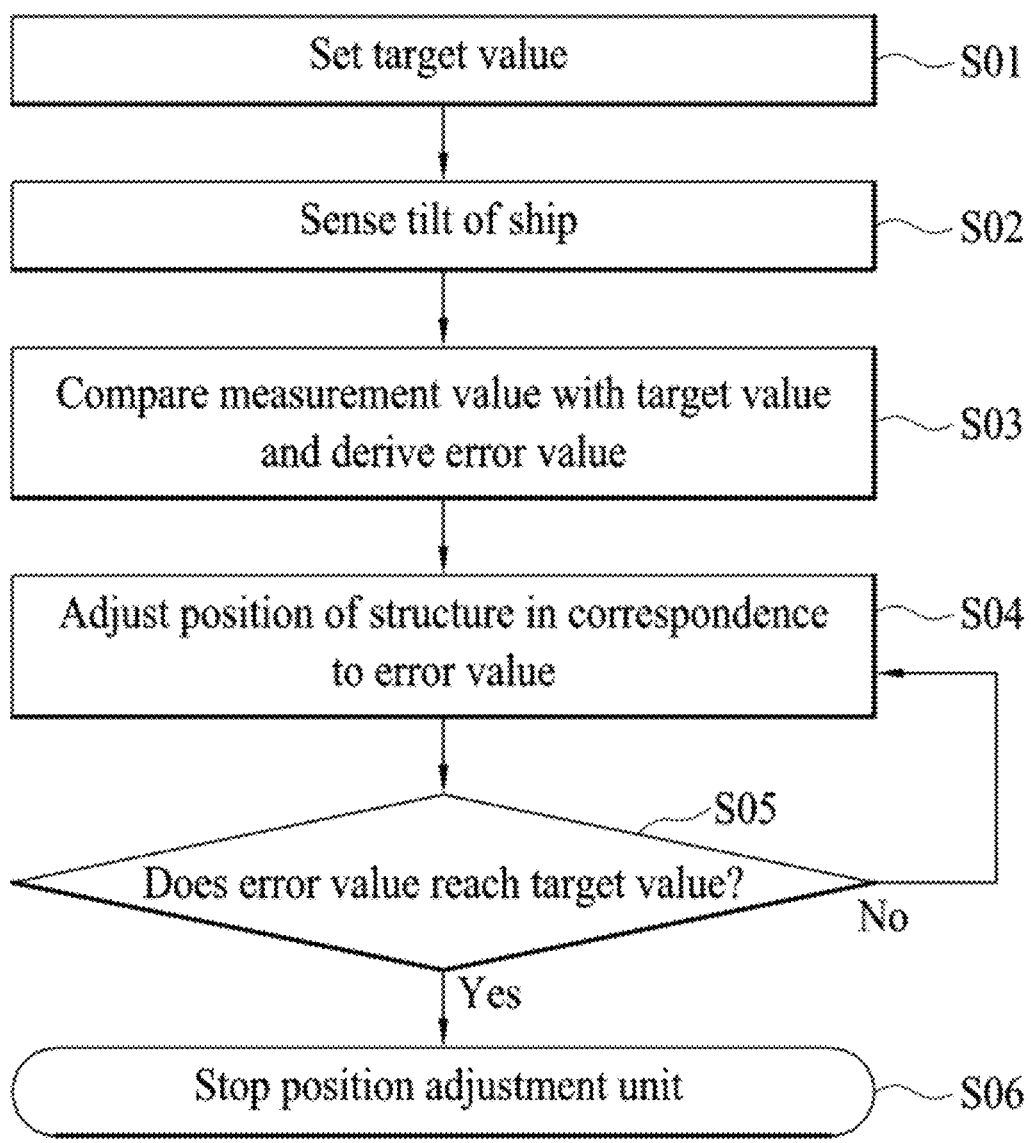

DEVICE FOR CONTROLLING HORIZONTALITY OF SMALL SHIP BY USING VARIABLE MAST

TECHNICAL FIELD

The present invention relates to a device for controlling a horizontality of a small ship by using a variable mast, and more particularly, to a device for correcting a horizontality of the small ship that corrects a tilt of the small ship in real time.

BACKGROUND ART

Generally, a small ship is lightweight, but is a planing craft type that maneuvers at a speed of 20 knots or higher. The speed, the maneuvering performance, and the seakeeping performance are greatly influenced according to a tilt such as trim and water wave at the time of sailing.

Therefore, there is a need for additional equipment to control the tilt of roll and pitching according to trim and water wave in a state of high-speed sailing.

In addition, in the related art, trim and tilt change are controlled by using a trim tab or an interceptor at the stern. However, thus, the resistance is increased, the thrust performance is deteriorated, the maneuverability is lowered, and the responsiveness is decreased. Therefore, there is a difficulty in controlling dynamic behavior in a rapidly changing sea state.

Therefore, a method for solving such problems is required.

DISCLOSURE

Technical Problem

The present invention has been made in view of the above problems, and provides a tilt sensing unit, provided in a small ship, for sensing a tilt of the small ship, and a position adjustment unit controlled to correct a tilt value so as to reduce a generated error value, by comparing a target value input to a horizontality control with a measurement value measured by the tilt sensing unit.

In addition, the position adjustment unit can adjust the movement according to the longitudinal direction, the width direction, and the height of the small ship, and is provided with a separate driving motor to precisely correct an error value.

Thus, the small ship can be precisely controlled, and it is possible not only to prevent overturning accidents or safety accidents occurring in the small ship, but also to achieve an efficient operation of the small ship.

The problems of the present invention are not limited to the above-mentioned problems, and other problems not mentioned can be clearly understood by those skilled in the art from the following description.

Technical Solution

In an aspect, there is provided a device for controlling the horizontality of a small ship by using a variable mast, the device including: a tilt sensing unit for sensing the tilt of the small ship; a position adjustment unit formed such that at least a portion thereof can move in the horizontal direction on the deck of the small ship, and having a separate mast loaded on an upper part thereof to support the mast such that the mast is located at a predetermined height or higher; and a horizontality control unit for correcting the center of gravity of the small ship by adjusting a position of the mast through the position adjustment unit in correspondence to the tilt sensed by the tilt sensing unit.

The horizontality control unit compares a preset target value for the tilt of the small ship with a measurement value measured by the tilt sensing unit and move the mast in correspondence to a generated error value to correct the center of gravity of the small ship.

The tilt sensing unit is provided in one side of the small ship and measures trim and heel of the small ship in real time.

The position adjustment unit comprises: a first sliding unit which slides in a second direction; and a second sliding unit which is formed on an upper part of the first sliding unit and slides in a first direction perpendicular to the second direction.

The position adjustment unit comprises an upper and lower portion support unit which is positioned between the second sliding unit and the mast and adjusts a vertical position of the mast.

The upper and lower portion support unit has a multi-joint structure in which a plurality of unit members are connected to be able to be bent along a longitudinal direction.

The position adjustment unit has a separate driving motor and precisely adjusts a position of the first sliding unit and the second sliding unit.

Advantageous Effects

A device for controlling a horizontality of a small ship by using a variable mast according to the present invention has the following effects.

First, the device for controlling a horizontality of a small ship by using a variable mast according to the present invention includes a horizontality control unit, compares a measurement value with a preset target value, and adjusts the position of an object through the position adjustment unit, so that an error value can be corrected in real time.

Second, the device for controlling a horizontality of a small ship by using a variable mast according to the present invention is formed such that the position adjustment unit is slidable in the longitudinal direction and the width direction of the small ship in order to correspond to the tilt of the small ship, and further includes the upper and lower portion support unit M of the multi-joint structure, so that it is possible to cope with the tilt of the small ship in correspondence to a change due to trim, wave, or the like.

Third, in the device for controlling a horizontality of a small ship by using a variable mast according to the present invention, the position adjustment unit is controlled by a motor so that the error value can be precisely corrected by the horizontality control unit.

The effects of the present invention are not limited to the effects mentioned above, and other effects not mentioned can be clearly understood by those skilled in the art from the description of the claims.

DESCRIPTION OF DRAWINGS

FIG. 1 is a perspective view illustrating a configuration of a device for controlling a horizontality of a small ship using a variable mast according to an embodiment of the present invention;

FIG. 2 is a plan view of a position adjustment unit in a device for controlling a horizontality of a small ship using a variable mast according to an embodiment of the present invention;

FIG. 3 is a view illustrating a position adjustment unit according to trim of a small ship in a device for controlling a horizontality of a small ship using a variable mast according to an embodiment of the present invention;

FIG. 4 is a view illustrating a state in which a position adjustment unit is adjusted in correspondence to an error value according to trim of a small ship in a device for controlling a horizontality of a small ship using a variable mast according to an embodiment of the present invention;

FIG. 5 is a view illustrating a position adjustment unit according to heel of a small ship in a device for controlling a horizontality of a small ship using a variable mast according to an embodiment of the present invention;

FIG. 6 is a view illustrating a state in which a position adjustment unit is adjusted in correspondence to an error value according to a heel of a small ship in a device for controlling a horizontality of a small ship using a variable mast according to an embodiment of the present invention;

FIG. 7 is a view illustrating a state in which an upper and lower portion support unit M of a position adjustment unit is extended in a longitudinal direction in a device for controlling a horizontality of a small ship using a variable mast according to an embodiment of the present invention;

FIG. 8 is a flowchart illustrating a sequence of operations in a device for controlling a horizontality of a small ship using a variable mast according to an embodiment of the present invention.

MODE FOR INVENTION

Hereinafter, preferred embodiments of the present invention will be described with reference to the accompanying drawings. In describing the present embodiment, the same designations and the same reference numerals are used for the same components, and further description thereof will be omitted.

The present invention eliminates a factor such as a speed at which a small ship V sailing at high speed is overturned, a maneuvering performance, and a seakeeping performance, thereby efficiently operating the small ship V, and will be described in detail with reference to drawings.

FIG. 1 is a perspective view illustrating a configuration of a device for controlling a horizontality of a small ship using a variable mast according to an embodiment of the present invention.

The device for controlling a horizontality of a small ship using a variable mast according to an embodiment of the present invention may roughly include a tilt sensing unit, a position adjustment unit 100, and a horizontality control unit.

Although the tilt sensing unit is not shown in the drawing, it may be formed inside the small ship V to sense the tilt of the small ship V.

More specifically, the tilt sensing unit may sense the tilt of the small ship V caused by the yawing or pitching phenomenon of the small ship V due to a high speed sailing of the small ship V on the sea and the influence of waves generated during the sailing.

In order to sense such a tilt, the tilt sensing unit may be formed of a gyrosensor.

Therefore, the tilt of the small ship V may be sensed by measuring a case where the center of gravity is deflected along three-axis directions of the x-axis, y-axis and z-axis in the small ship V.

Meanwhile, the position adjustment unit 100 may be formed such that at least a portion of the position adjustment unit 100 can move in the horizontal direction on the deck of the small ship V and a separate mast E is loaded on an upper part of the position adjustment unit 100, and support the mast such that the mast is located at a predetermined height or higher.

As shown in the drawing, the position adjustment unit 100 may be formed on an upper part of the small ship.

The position adjustment unit 100 may include a first sliding unit 120 that slides in a first direction and a second sliding unit 140 that is formed on an upper part of the first sliding unit 120 and slides in a second direction perpendicular to the first direction.

Here, the first direction may be formed in the width direction of the small ship V, and the second direction may be formed in the longitudinal direction of the small ship V.

The position adjustment unit 100 may be formed such that the first sliding unit 120 and the second sliding unit 140 are slid on the upper part of the small ship V, and the mast E may be formed on the upper part of the second sliding unit 140.

The mast E may be configured such that various types of structures are installed on the upper part of the second sliding unit 140. In the case of the small ship V, the weight of the mast E occupies a significant portion of the total weight of small ship V. Thus, the center of gravity of the small ship V can be moved just only by adjusting the position of the mast E by the position adjustment unit 100.

In the present embodiment, the small ship V may be a high speed unmanned ship, and thus, the mast E may include a heavy object such as a radar for controlling the small ship V, a thermo-graphic camera, and various antennas. Various objects necessary for the small ship V may be loaded according to a person skilled in the art.

In addition, the mast E may be formed in a T shape, and may be coupled to the second sliding unit by a hinge or in the form of a universal joint so as to maintain a balanced state irrespective of a tilt angle of the small ship V.

Further, in order to move for position movement, the position adjustment unit 100 may be provided with a separate rail portion R.

Specifically, the position adjustment units 100 may be implemented in the stacked form of a plurality of configurations, and the rail portion R may be formed to move in correspondence with a tilt.

As shown in the drawing, the rail portion R may include a plurality of first rails R1 formed in the longitudinal direction of the small ship V and a second rail R2 formed in a direction perpendicular to the first rail R1.

Further, the rail portion R may be formed such that the position adjustment unit 100 can be moved in correspondence to the tilt, and the details will be described later with reference to FIG. 2.

The horizontality control unit may adjust the position of the mast E through the position adjustment unit 100 in correspondence to the tilt sensed by the tilt sensing unit, and correct the center of gravity of the small ship V.

Specifically, the horizontality control unit may be formed inside the small ship V, and may control to move the position adjustment unit 100 in correspondence to the tilt so as to correct the tilt of the small ship V provided from the tilt sensing unit.

Accordingly, the horizontality control unit may compare a target value previously set for the tilt of the small ship V with a measurement value measured by the tilt sensing unit and move the position of the mast E in correspondence to the generated error value, so that the center of gravity of the small ship can be corrected.

Here, the target value may be a reference value for correcting the measurement value measured by the tilt sensing unit. The tilt when the small ship V has a parallel state on the sea surface may be set to '0', or may be set to a threshold value which is a limit value at which the small line V is overturned.

Therefore, the position adjustment unit 100 may be moved to correct a difference between the target value and the measurement value.

Specifically, the horizontality control unit may compare the target value with the measurement value in real time in correspondence to the tilt of the small ship V sensed in real time by the tilt sensing unit so that the tilt of the small ship V can be corrected to be in parallel with the sea surface.

Next, a movement for controlling the position adjustment unit 100 by the horizontality control unit will be described with reference to FIG. 2.

FIG. 2 is a plan view of a position adjustment unit 100 in a device for controlling a horizontality of a small ship using a variable mast according to an embodiment of the present invention.

The position adjustment unit 100 may be formed to be corrected in correspondence to the tilt of the small ship V on the upper part of the small ship V.

Here, like a coordinate shown in the drawing, the first direction indicates the width direction of the small ship V and the second direction indicates the length direction of the small ship V.

The rail portion R may be formed of a plurality of configurations along the first direction and the second direction.

As shown in the drawing, the rail portion R may be formed of a plurality of configurations on the upper part of the small ship V. The first sliding unit 120 and the second sliding unit 140 may be formed in the first rail R1 and the second rail R2 respectively on the upper portion of the rail portion R.

Specifically, the first rail R1 may be formed such that the first sliding unit 120 can be moved in the second direction, and the second rail R2 may be formed such that the second sliding unit 140 can be moved in the first direction.

Accordingly, the first sliding unit 120 can move along the y-axis in a coordinate shown in the drawing, and the second sliding unit 140 can move along the x-axis.

As described above, the position adjustment unit 100 can move to shift its position on the small ship V in correspondence to the x-axis and the y-axis, and accordingly, can move such that the measurement value is corrected to the target value in correspondence to the tilt of the small ship V by the horizontality control unit.

The rail portion R is just an embodiment of the present invention, and is not limited to a rail form and various modifications can be achieved by those skilled in the art, if the position adjustment unit 100 can be moved to shift its position in the longitudinal direction and the width direction of the small ship to the extent that the horizontality control unit can control the position adjustment unit 100.

Next, it is illustrated that the position adjustment unit 100 is moved to shift its position by the horizontality control unit.

FIG. 3 is a view illustrating a position adjustment unit 100 according to trim of a small ship in a device for controlling a horizontality of a small ship using a variable mast according to an embodiment of the present invention, FIG. 4 is a view illustrating a state in which a position adjustment unit 100 is adjusted in correspondence to an error value according to trim of a small ship in a device for controlling a horizontality of a small ship using a variable mast according to an embodiment of the present invention, FIG. 5 is a view illustrating a position adjustment unit 100, before controlled, according to heel of a small ship in a device for controlling a horizontality of a small ship using a variable mast according to an embodiment of the present invention, and FIG. 6 is a view illustrating a state in which a position adjustment unit 100 is adjusted in correspondence to an error value according to a heel of a small ship in a device for controlling a horizontality of a small ship using a variable mast according to an embodiment of the present invention.

The small ship V may be tilted by the waves while sliding on the sea.

In the coordinate shown in the drawing, the width direction of the small ship V is represented by the x-axis, and the longitudinal direction of the small ship V is represented by the y-axis.

The state where the small ship V is tilted in the x-axis direction may be indicated as the heel and the state where the small ship V is tilted in the y-axis direction may be indicated as the trim, and the tilt in the x-axis direction of the small ship V may be indicated as the heel and the tilt in the y-axis direction of the small ship V may be indicated as the trim.

Therefore, the tilt sensing unit may be provided in one side of the small ship V, and measure the heel and the trim of the small ship V in real time and, in correspondence to this, the horizontality control unit may move the position adjustment unit 100 to achieve correction so that the tilt value becomes zero.

As shown in FIG. 3 and FIG. 4, when the small ship V is tilted as trim, the tilting sensing unit may sense the trim of the small ship V.

The horizontality control unit may move the position adjustment unit 100 in various directions to control the trim sensed by the tilt sensing unit and correct the trim.

As shown in the drawing, the small ship V may be tilted by the generation of wave or the like, the tilt sensing unit may sense the angle of the trim in real time, and the horizontality control unit may move the position adjustment unit 100 in real time in correspondence to the angle of the trim.

Here, it is illustrated that the tilt sensing unit is implemented by a gyro sensor. However, the gyro sensor is just an embodiment of the present invention, and it is obvious that if the angle of the trim and the heel that occur in a state where the small ship V is parallel to the sea surface can be sensed in real time, the present invention is not limited to the gyro sensor and can be easily changed by those skilled in the art.

Next, in FIG. 5 and FIG. 6, the tilt sensing unit may respond to the heel of the small ship V, and the horizontality control unit may correct the heel.

As shown in the drawing, the tilt sensing unit may sense an angle of the heel of the small ship V, and the horizontality control unit may move the position adjustment unit 100 to shift its position in correspondence to the heel angle sensed by the tilt sensing unit so that the heel can be corrected.

Referring to the drawing, for example, the small ship V may have the heel to the left, the tilt sensing unit may sense this in real time, and the horizontality control unit may move the position adjustment unit 100 to the right which is the opposite direction of the tilting so that the heel can be corrected.

In addition, the tilt sensing unit may sense the trim or the heel, to the the left or right side of the small ship V, in real time, and may move the position adjustment unit 100 to shift its position so that the trim or the heel can be corrected.

Here, the tilt of the small ship V indicates the trim or the heel, but the tilt of all angles along the circumference of the small ship including the x, y-axis as well as the x-axis and the y-axis can be corrected.

In addition, in a situation where not only the weight of the small ship V but also an external force that is difficult to predict such as wave is added, it may happen that the correction cannot be achieved just only by the movement of the position adjustment unit 100 in the direction of the x axis and the y axis. Thus, the operation of just increasing the load of the mast E may lead to the increase of the overall load of the small ship, so that high-speed sailing may be hindered and fuel loss may occur.

Therefore, the force of moment may be added by using three axes including the x-axis, the y-axis, and the z-axis by adjusting the height in the z-axis direction that is the vertical direction on the deck of the small ship V.

FIG. 7 is a view illustrating a state in which an upper and lower portion support unit M of a position adjustment unit 100 is extended in a longitudinal direction in a device for controlling a horizontality of a small ship using a variable mast according to an embodiment of the present invention.

The position adjustment unit 100 may further include the upper and lower portion support unit M which is positioned between the second sliding unit 140 and the mast E, and adjusts the vertical position of the mast E.

The upper and lower portion support unit M may be formed in a multi-joint structure in which a plurality of unit members are connected to be able to be bent along the longitudinal direction, and the mast E may be loaded on the upper part.

The upper and lower portion support unit M may be rotatably coupled to the upper surface of the second sliding unit 140 and the joint portion may also be formed of a universal joint which is rotatable.

The length of the upper and lower portion support unit M can be adjustable in the vertical direction and can rotate in multiple angles including the x axis and the y axis of the small ship V.

The device for controlling a horizontality of a small ship by using a variable mast according to an embodiment of the present invention may be, as described above, a device which adjusts the center of gravity of the small ship by correcting the tilt of the small ship V by using the mast E occupying a considerable weight in the small ship V, and can move its position in correspondence to the tilt by using a multi-joint structure. The mast E may be coupled to the upper and lower portion support unit M by a hinge or by a universal joint structure, so that the mast E can maintain the equilibrium state even if the small ship V is tilted.

In addition, the upper and lower portion support unit M can be controlled by the horizontality control unit.

Therefore, the upper and lower portion support unit M can correct the tilt by moving the mast E in the x-axis, the y-axis, and the z-axis in correspondence to the heel and the trim of the small ship V.

For example, when the small ship V is tilted with the trim to the left, the tilt sensing unit may sense the tilt and measures the measurement value, and the horizontality control unit may move the position adjustment unit 100 to shift its position in correspondence to the error generated between the target value and the measurement value.

At this time, the position adjustment unit 100 may be moved to a corresponding position and, since the mast E is formed adjacent to the center of gravity of the small ship V, there is a limit to correct the error value.

Therefore, when the mast E is spaced apart lengthways upwardly from the small ship V and is moved to the right with a spaced height, the mast E may provide the trim moment as much as the height spaced apart from the small ship so that correction can be achieved in correspondence to the trim.

Furthermore, the position adjustment unit 100 may include a separate driving motor to accurately adjust the movement for position shift of the first sliding unit 120, the second sliding unit 140, and the upper and lower portion support unit M.

The multi-joint type of the upper and lower portion support unit M is just an embodiment of the present invention, and, if the length is extended to the upper side and a tilt can be generated in the direction of the x-axis and the y-axis, a telescopic structure may be coupled to the small ship V by a hinge, and this can be easily changed by a person skilled in the art and does not restrict the scope of the invention.

FIG. 8 is a flowchart illustrating a sequence of operations in a device for controlling a horizontality of a small ship using a variable mast according to an embodiment of the present invention.

The horizontality control unit may set the target value before and after the small ship V is driven (S01).

As described above, the target value may be variously set within a range in which the small ship V is not tilted or not overturned.

Then, the tilt sensing unit may operate to sense the tilt including the trim and the heel of the small ship V in real time (S02).

The sensed tilt may be measured in real time by the horizontality control unit and the error value may be derived by comparing the measurement value with a preset target value (S03).

Then, the horizontality control unit may move the position adjustment unit 100 in real time so that the error value reaches the target value (S04).

Here, it is determined whether the error value reaches the target value (S05).

If the error value reaches the target value, the position adjustment unit 100 may be stopped (S06), and if the error value does not reach the target value, the horizontality control unit may move the position adjustment unit 100 in correspondence to the error value.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims. Accordingly, the scope of the present invention is not construed as being limited to the described embodiments but is defined by the appended claims as well as equivalents thereto.

The invention claimed is:

1. A device for correcting horizontality of a small ship by using a variable mast, the device comprising:
   a tilt sensing unit for sensing a tilt of the small ship;
   a position adjustment unit formed such that at least a portion thereof can move in a horizontal direction on a deck of the small ship, and having a separate mast loaded on an upper part thereof to support the mast such that the mast is located at a predetermined height or higher; and
   a horizontality control unit for adjusting a position of the mast through the position adjustment unit in correspondence to the tilt sensed by the tilt sensing unit and correcting a center of gravity of the small ship.

2. The device of claim 1, wherein the horizontality control unit compares a preset target value for the tilt of the small ship with a measurement value measured by the tilt sensing unit and move the mast in correspondence to a generated error value to correct the center of gravity of the small ship.

3. The device of claim 1, wherein the tilt sensing unit is provided in one side of the small ship and measures trim and heel of the small ship in real time.

4. The device of claim 1, wherein the position adjustment unit comprises:
   a first sliding unit which slides in a second direction; and
   a second sliding unit which is formed on an upper part of the first sliding unit and slides in a first direction perpendicular to the second direction.

5. The device of claim 4, wherein the tilt sensing unit comprises an upper and lower portion support unit which is positioned between the second sliding unit and the mast and adjusts a vertical position of the mast.

6. The device of claim 1, wherein the upper and lower portion support unit has a multi-joint structure in which a plurality of unit members are connected to be able to be bent along a longitudinal direction.

7. The device of claim 1, wherein the position adjustment unit has a separate driving motor and precisely adjusts a position of the first sliding unit and the second sliding unit.

\* \* \* \* \*